US012704728B2

(12) United States Patent
Wang et al.

(10) Patent No.: US 12,704,728 B2
(45) Date of Patent: Aug. 11, 2026

(54) PRISMS FOR INDEPENDENT CONTROL OVER VIRTUAL IMAGE AND WORLD LEAKAGE ANGLES

(71) Applicant: Applied Materials, Inc., Santa Clara, CA (US)

(72) Inventors: Evan Wang, Palo Alto, CA (US); Kevin Messer, Mountain View, CA (US); Samarth Bhargava, Saratoga, CA (US); David Alexander Sell, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 19/054,288

(22) Filed: Feb. 14, 2025

(65) Prior Publication Data

US 2025/0264653 A1 Aug. 21, 2025

Related U.S. Application Data

(60) Provisional application No. 63/565,287, filed on Mar. 14, 2024, provisional application No. 63/554,618, filed on Feb. 16, 2024.

(51) Int. Cl.
*G02B 27/01* (2006.01)
*F21V 8/00* (2006.01)

(52) U.S. Cl.
CPC ....... *G02B 27/0172* (2013.01); *G02B 6/0016* (2013.01); *G02B 6/003* (2013.01); (Continued)

(58) Field of Classification Search
CPC ........ G02B 5/18; G02B 6/0016; G02B 6/003; G02B 6/0036; G02B 27/0172; G02B 2027/0125
See application file for complete search history.

(56) References Cited

U.S. PATENT DOCUMENTS 10,409,001 B2 9/2019 Young et al.
11,367,589 B2 6/2022 Olson et al.
(Continued)

FOREIGN PATENT DOCUMENTS

CN 105572874 A 5/2016
CN 114730084 A 7/2022
(Continued)

OTHER PUBLICATIONS

International Search Report and Written Opinion dated Jun. 2, 2025 for Application No. PCT/US2025/016074.
(Continued)

*Primary Examiner* — Keith G. Delahoussaye

(74) *Attorney, Agent, or Firm* — Patterson + Sheridan, LLP

(57) ABSTRACT

In some embodiments, an optical device includes a waveguide having a first surface and a second surface opposing the first surface. The waveguide further includes an input coupler and an output coupler disposed over the first surface or the second surface. The optical device further includes a first prism disposed over at least the output coupler and over the first surface. The first prism is operable to increase a first projection angle of an image relative to a horizontal plane of the waveguide. The optical device further includes a second prism disposed under at least the output coupler and under the second surface. The second prism is operable to increase the second projection angle of light leakage relative to the horizontal plane of the waveguide.

15 Claims, 6 Drawing Sheets

(52) U.S. Cl.
CPC ......... *G02B 6/0036* (2013.01); *G02B 6/0065* (2013.01); *G02B 2027/0125* (2013.01); *G02B 2027/0178* (2013.01)

(56) References Cited

U.S. PATENT DOCUMENTS 11,480,724 B2 10/2022 Evans et al.
11,740,466 B1 8/2023 Bhakta et al.
2017/0329137 A1* 11/2017 Tervo .................... G02B 6/003
2020/0400990 A1 12/2020 Godet et al.
2021/0231856 A1* 7/2021 Tang ..................... G02B 6/002
2022/0011496 A1 1/2022 Bhakta et al.
2022/0308460 A1 9/2022 Xu et al.
2022/0357529 A1 11/2022 Messer et al.
2022/0357655 A1 11/2022 Sell et al.
2022/0397744 A1 12/2022 Pang et al.
2023/0117647 A1 4/2023 Messer et al.
2023/0118081 A1 4/2023 Yang et al.
2023/0118998 A1 4/2023 Komanduri et al.
2023/0350212 A1 11/2023 Held et al.
2025/0085562 A1* 3/2025 Lin ....................... G02B 6/004

FOREIGN PATENT DOCUMENTS

TW 202300987 A 1/2023
WO 2020-236862 A1 11/2020

OTHER PUBLICATIONS

Taiwan Office Action dated Oct. 1, 2025 for Application No. 114105557.
Taiwanese Office Action for Application No. 114105557 dated May 4, 2026.

* cited by examiner

PRISMS FOR INDEPENDENT CONTROL OVER VIRTUAL IMAGE AND WORLD LEAKAGE ANGLES

CROSS-REFERENCE TO RELATED APPLICATIONS

This application claims benefit of U.S. Provisional Patent Application No. 63/554,618 filed Feb. 16, 2024 and U.S. Provisional Patent Application No. 63/565,287, filed Mar. 14, 2024, which are herein incorporated by reference in their entirety.

BACKGROUND

Field

Embodiments of the present disclosure relate to optical devices having a waveguide with eye-side and world-side prisms.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

Accordingly, what is needed in the art are optical devices having a waveguide with eye-side and world-side prisms.

SUMMARY

In some embodiments, an optical device includes a waveguide having a first surface and a second surface opposing the first surface. The waveguide further includes an input coupler and an output coupler disposed over the first surface or the second surface. The optical device further includes a first prism disposed over at least the output coupler and over the first surface. The first prism is operable to increase a first projection angle of an image relative to a horizontal plane of the waveguide. The optical device further includes a second prism disposed under at least the output coupler and under the second surface. The second prism is operable to increase the second projection angle of light leakage relative to the horizontal plane of the waveguide.

In some embodiments, an optical device includes a waveguide having a first surface and a second surface opposing the first surface. The waveguide further includes an input coupler and an output coupler disposed over the first surface or the second surface. The optical device further includes an eye-side prism disposed over at least the output coupler and over the first surface. The eye-side prism is disposed on a first material disposed over the first surface. The first material has a refractive index of 1.1 or less. The optical device further includes a world-side prism disposed over at least the output coupler and over the second surface. The world-side prism is disposed on a second material disposed over the second surface. The second material has a refractive index of 1.1 or less.

In some embodiments, an optical device includes a waveguide having a first surface and a second surface opposing the first surface. The waveguide further includes an input coupler and an output coupler disposed over the first surface or the second surface. The optical device further includes a push lens disposed over the first surface. The push lens has a first prism disposed on or in the push lens. The first prism has a first thickness that decreases from a first end of the first prism to a second end of the first prism. The optical device further includes a pull lens disposed under the second surface. The pull lens has a second prism disposed on or in the pull lens. The second prism includes a second thickness that increases from a first end of the second prism to a second end of the second prism. The first end of the first prism is opposite the first end of the second prism. The second end of the first prism is opposite the second end of the second prism.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appendix. It is to be noted, however, that the appendix illustrates only typical embodiments of this disclosure and are therefore not to be considered limiting of its scope, for the disclosure may admit to other equally effective embodiments.

DETAILED DESCRIPTION

Embodiments of the present disclosure generally relate to augmented reality displays. More specifically, optical devices having a waveguide with eye-side and world-side prisms. The optical devices described herein have an eye-side prism and a world-side prism. The eye-side prism increases the angle of the image projected to the eye relative to a horizontal plane of the waveguide such that the FOV is lower relative to the user's eye. The world-side prism increases the angle of the light leakage relative to the horizontal plane of the waveguide such that the world leakage angle is lower relative to the user's eye. As used herein, the term "field of view location" (herein after referred to as "FOV") is a point at which a user perceives the virtual images of an augmented reality display to be located. As used herein, the term "world leakage angle" is the direction of light that is emitted on the world side of the waveguide.

Figure 1:
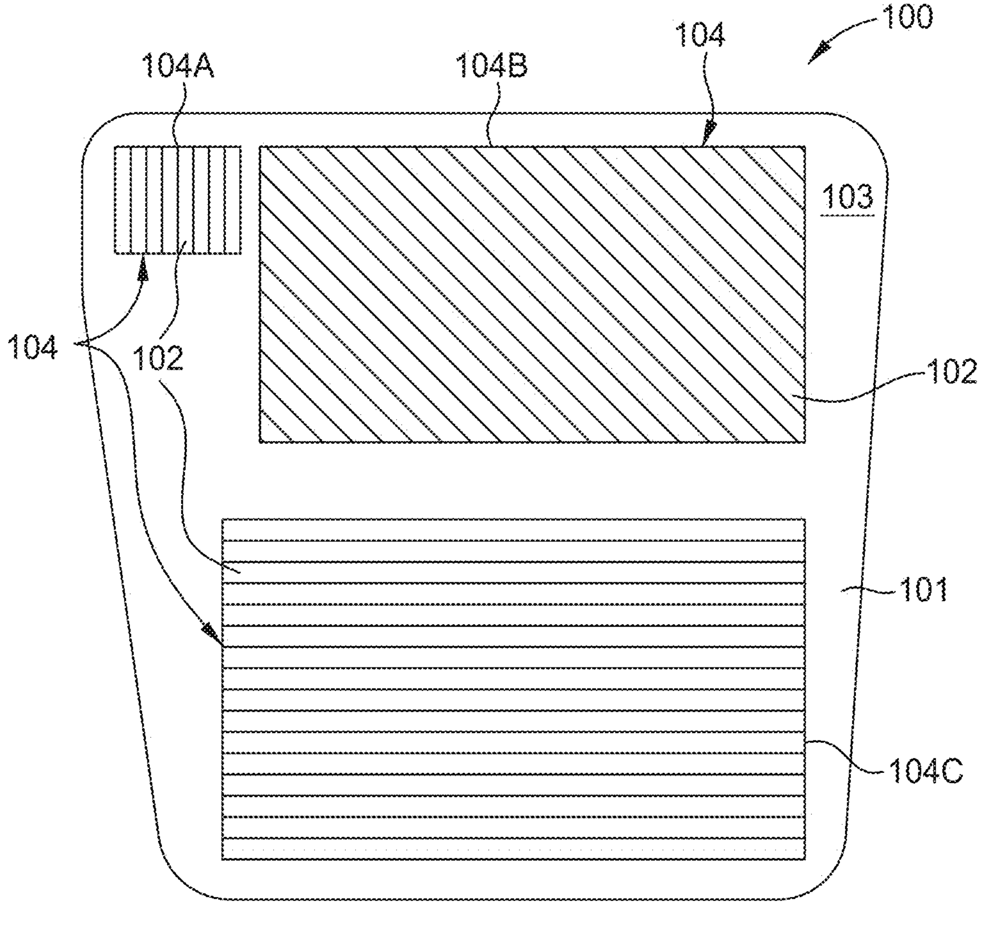
FIG. 1 is a perspective, frontal view of a waveguide, according to at least one embodiment.

FIG. 1 is a perspective, frontal view of a waveguide 100. It is to be understood that the waveguide 100 described herein is an exemplary waveguide and that other waveguides may be used with or modified to accomplish aspects of the present disclosure. The waveguide 100 includes a plurality of structures 102. The structures 102 may be disposed over, under, or on a surface 103 of a substrate 101, or disposed in the substrate 101. The structures 102 are nanostructures have a sub-micron critical dimension, e.g., a width less than 1 micrometer. Regions of the structures 102 correspond to one or more gratings 104. In one embodiment, which can be combined with other embodiments described herein, the waveguide 100 includes at least an incoupler grating 104*a* and an outcoupler grating 104*c*. In another embodiment, which can be combined with other embodiments described herein, the waveguide 100 further includes an intermediate grating 104*b*. The intermediate grating 104*b* corresponds to a pupil expansion grating ("pupil expander") or a fold grating.

Figure 2A:
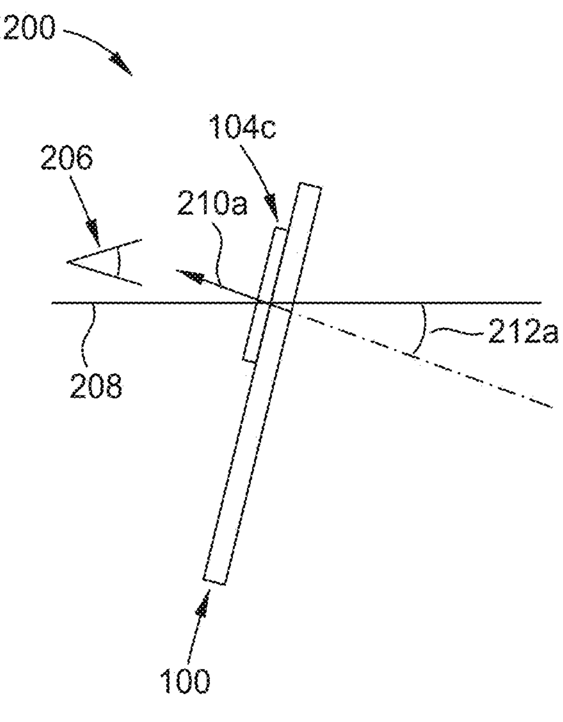
FIGS. 2A and 2B are schematic views of a portion of a waveguide, according to at least one embodiment.
Figure 2B:
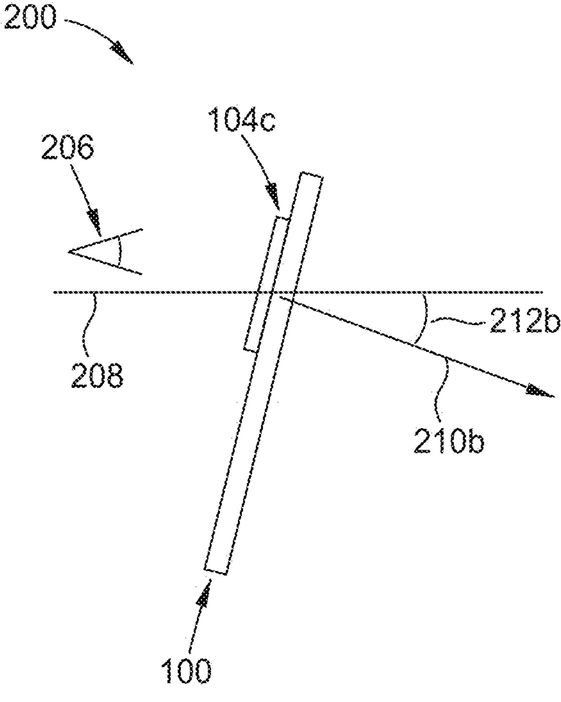

FIGS. 2A and 2B are schematic views of a portion of a waveguide 100. The waveguide 100 includes the outcoupler grating 104*c* disposed on the eye-side of the waveguide 100. I.e., the outcoupler grating 104*c* is disposed on the side of the waveguide 100 closest to the user's eye 206. A horizontal plane 208 is shown in both FIGS. 2A and 2B that is parallel to the to the user's eye 206. As shown in FIG. 2A, the image 210*a* projected to the user's eye 206. The image 210*a* has a first projection angle 212*a* relative to the projection of the image 210*a* and the horizontal plane 208. The eye-side prism(s) 304, 502, and/or 802 (as show in FIGS. 3-8) of the optical device(s) 300, 400, 500, 600, 700, and/or 800 described herein increases the first projection angle 212*a* of the image projected to the user's eye 206 relative to a horizontal plane 208 of the waveguide 100 such that the FOV is lower relative to the user's eye 206. The low FOV can provide user comfort during normal operation and use of the device. As shown in FIG. 2B, the leaked light 210*b* is projected from the world-side of the waveguide 100. The leaked light 210*b* has a second projection angle 212*b* relative to the horizontal plane 208. The world-side prism(s) 308, 504, and 804 (as show in FIGS. 3-8) of the optical device(s) 300, 400, 500, 600, 700, and/or 800 described herein increases the second projection angle 212*b* of the light leakage relative to the horizontal plane 208 of the waveguide 100 such that the world leakage angle is lower relative to the user's eye 206. A low world leakage angle reduces visibility from the world side and is desirable for to user privacy during use and operation of the optical device.

Figure 3:
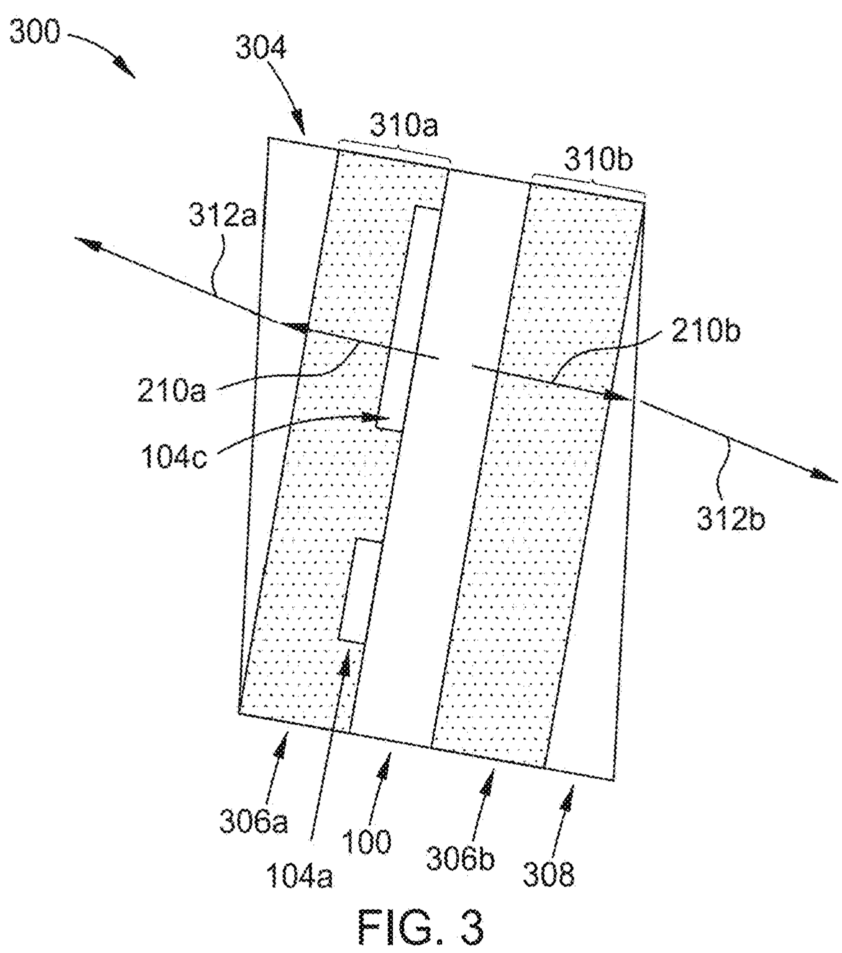
FIG. 3 is a schematic cross-sectional view of an optical device, according to at least one embodiment.

FIG. 3 is a schematic cross-sectional view of an optical device 300. In at least one embodiment, which can be combined with other embodiments described herein, the optical device 300 includes a waveguide 100 with an outcoupler grating 104*c* and an incoupler grating 104*a* disposed on the eye-side surface of the waveguide 100. A first prism 304 is disposed over the eye-side surface of the waveguide 100. In one embodiment, the first prism 304 is coupled to the waveguide 100 by a first adhesive layer 306*a*. In other embodiments, an air-gap is disposed between the first prism 304 and the waveguide 100. The first adhesive layer 306*a*, and the second adhesive layer 306*b* have a refractive index of 1.1 or less. The air-gaps have a refractive index of 1.0. In at least one embodiment, the first prism 304 is disposed substantially over the eye-side surface of the waveguide 100. Additionally, a second prism 308 is disposed over the world-side surface of the waveguide 100. In one embodiment, the second prism 308 is coupled to the waveguide 100 with the second adhesive layer 306*b*. In at least one embodiment, the second prism 308 is disposed substantially over the world-side surface of the waveguide 100. Without being bound by theory, the first prism 304 on the eye-side surface of the waveguide 100 lowers the FOV location by raising the incident light 312*a* to be projected to the eye, while the second prism 308 on the world-side surface of the waveguide 100 lowers the world-side leakage angle of the incident light 312*b*. In addition, the first prism 304 and the second prism 308 are designed such that their effects cancel each other out for light coming in from outside the optical device 300, causing no see through distortion. In some embodiments, the first prism 304 and the second prism 308 may independently be comprised of an optically transparent having a refractive index (RI) of greater than about 1.0, such as greater than about 1.2, such as greater than about 1.4. In at least one embodiment, the prisms may individually by selected from the group including glass materials, aluminium oxide based materials, polycarbonate materials, acrylic materials, titanium oxide based materials, or combinations thereof. In some embodiments, which can be combined with other embodiments described herein, the first prism 304 and/or the second prism 308 can include a tapered thickness along the length of the waveguide 100. In other words, the prisms have a continuously decreasing thickness along the length of at least one of the first prism 304 or the second prism 308, such that one end of the first prism 304 and/or the second prism 308 has a thickness greater than the opposite end of the first prism 304 and/or the second prism 308, respectively. In one or more embodiments, which can be combined with other embodiments described herein, the end of the first prism 304 and/or the second prism 308 having a greater thickness may include a thickness of up to about 10 mm, such as about 1 mm to about 10 mm, such as about 2.5 mm to about 10 mm, such as about 5 mm to about 10 mm. In one or more embodiments, which can be combined with other embodiments described herein, the end of the first prism 304 and/or the second prism 308 having a lesser thickness may include a thickness of greater than about 100 μm, such as about 100 μm to about 1,000 μm, such as about 100 μm to about 500 μm, such as about 100 μm to about 250 μm. In at least one embodiment, the first prism 304 and the second prism 308 are oriented such that there exists a balance in the optical effect on the opposite side. In other words, the end of the second prism 308 having a greater thickness is opposite the end of the first prism 304 having a greater thickness.

In some embodiments, which can be combined with other embodiments, described herein, prism structures of the present disclosure may be coupled to a waveguide 100 such that there exists a "gap" between the surface of the waveguide 100 and the first prism 304 (i.e., the gap 310*a* as shown in FIG. 3) and/or between the surface of the waveguide 202 and the second prism 308 (i.e., the gap 310*b* as shown in FIG. 3). In one or more embodiments, which can be combined with other embodiments described herein, a first adhesive layer 306*a* and/or the second adhesive layer 306*b* can include a low refractive index material, such as a silica containing material and/or a polymeric material. A silica-containing material can include a silica-containing aerogel material having a nanoscale porosity to provide air gaps in the space between the waveguide and the prism. The silica-containing aerogel material can include a porosity of greater than about 95%, wherein such porosity reduces the refractive index of silica.

In some embodiments, which can be combined with other embodiments described herein, a silica-containing aerogel material can be formed from a silica-containing aerogel material formation process. The formation process may include one or more of a precursor preparation process, deposition process, or supercritical drying process. The precursor preparation process includes preparing silica sol-gels. The sol (e.g., solution) is prepared by addition of a catalyst to a silica precursor solution in a solvent. Examples of the silica precursor include, but are not limited to, tetraethy lorthosilicate (TEOS), tetramethy lorthosilicate (TMOS), methyltrimethoxysilane (MTMS), methyltriethoxysilane (MTMS), methyltriethoxysilane (MTES), silbond H-5, or polyethoxydisiloxane (PEDS). Examples of the catalyst include, but are not limited to, hydrofluoric acid (HF), hydrogen chloride (HCl), nitric acid ($HNO_3$), sulfuric acid ($H_2SO_4$), oxalic acid ($C_2H_2O_4$), acetic acid ($CH_3COOH$), trifluoroacetic acid (TFA), or ammonium hydroxide ($NH_4OH$). Examples of the solvent precursor include, but are not limited to, methanol, ethanol, and isopropanol. The gel is prepared by ageing the solution, which strengthens the solution into a sol-gel by crosslinking. The ageing of the sol-gel keeps the shrinkage during drying to the supercritical drying process.

Figure 4:
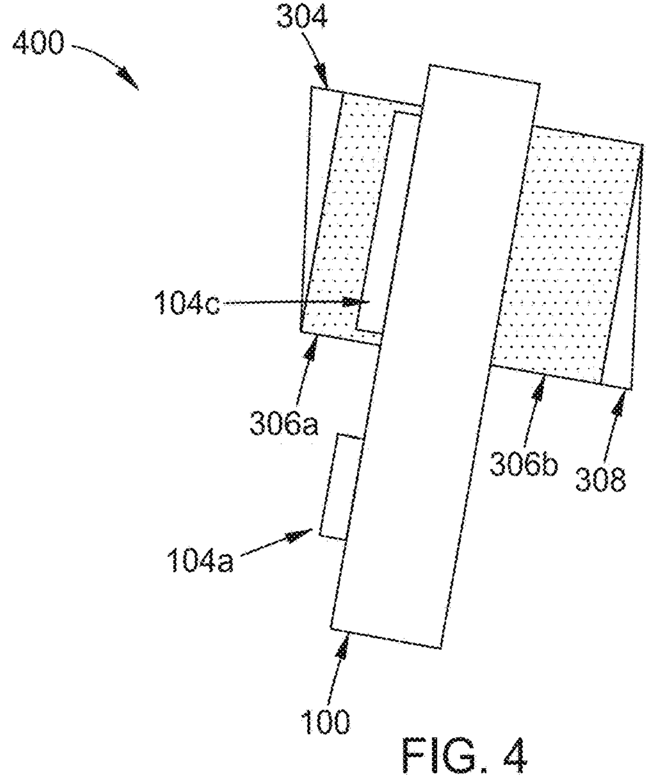
FIG. 4 is a schematic cross-sectional view of an optical device, according to at least one embodiment.

FIG. 4 is a schematic cross-sectional view of an optical device 400 according to one or more embodiments. In at least one embodiment, which can be combined with other embodiments described herein, the optical device 400 includes a waveguide 100 with an outcoupler grating 104*c* and an incoupler grating 104*a* disposed on the eye-side surface of the waveguide 100. A first prism 304 is disposed over the eye-side surface of the waveguide 100. In one emboidiment, the first prism 304 is coupled to the waveguide 100 with the first adhesive layer 306*a*. In at least one embodiment, the first prism 304 is at least partially disposed over the eye-side surface of the waveguide 100. In at least one embodiment, the first prism 304 is disposed substantially over the outcoupler grating 104*c* and partially over the eye-side surface of the waveguide 100. In at least one embodiment, the first adhesive layer 306*a* is at least partially disposed over the eye-side surface of the waveguide 100. In at least one embodiment, the first adhesive layer 306*a* is disposed substantially over the outcoupler grating 104*c* and partially over the eye-side surface of the waveguide 100. A second prism 308 is disposed over the world-side surface of the waveguide 100 In one embodiment, the second prism 308 is coupled to the waveguide with the second adhesive layer 306*b*. In at least one embodiment, the second prism 308 is at least partially disposed over the world-side surface of the waveguide 100. In at least one embodiment, the second prism 308 is disposed directly opposite the first prism 304. In at least one embodiment, the second adhesive layer 306*b* is at least partially disposed over the world-side surface of the waveguide 100. In at least one embodiment, the second adhesive layer 306*b* is disposed directly opposite the first adhesive layer 306*a*.

Figure 5:
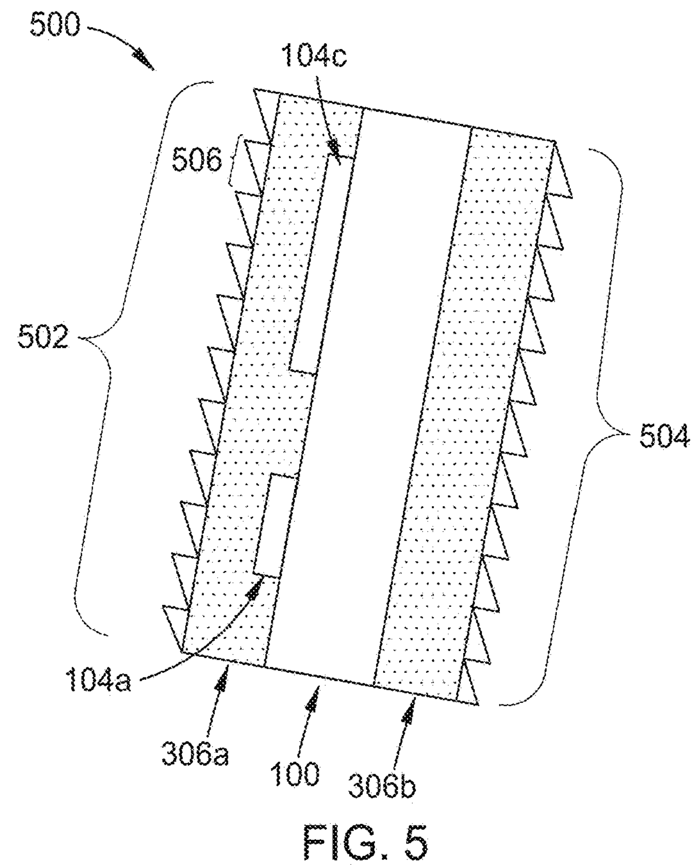
FIG. 5 is a schematic cross-sectional view of an optical device, according to at least one embodiment.

FIG. 5 is a schematic cross-sectional view of an optical device 500 according to one or more embodiments. In at least one embodiment, which can be combined with other embodiments described herein, the optical device 500 includes a waveguide 100 with an outcoupler grating 104*c* and an incoupler grating 104*a* disposed on the eye-side surface of the waveguide 100. A first micro-prism array 502 is disposed over the eye-side surface of the waveguide 100. In one embodiment, the first micro-prism array 502 is coupled to the waveguide 100 with the first adhesive layer 306*a*. In at least one embodiment, the first micro-prism array 502 is at least partially disposed over the eye-side surface of the waveguide 100. In at least one embodiment, the first micro-prism array 502 is disposed substantially over the outcoupler grating 104*c* and partially over the eye-side surface of the waveguide 100. A second micro-prism array 504 is disposed over the world-side surface of the waveguide 100. in one embodiment, the second micro-prism array 504 is coupled to the waveguide 100 with the second adhesive layer 306*b*. In at least one embodiment, the second micro-prism array 504 is at least partially disposed over the world-side surface of the waveguide 100. In at least one embodiment, the second micro-prism array 504 is disposed directly opposite the first micro-prism array 502.

In at least one embodiment, which can be combined with other embodiments described herein, a micro-prism 506 of the first micro-prism array 502 and/or the second micro-prism array 504 can include a tapered thickness wherein the end with the greater thickness may include a thickness of up to about 10 mm, such as about 0.1 μm to about 10 mm, such as about 10 μm to about 10 mm, such as about 100 μm to about 10 mm, such as about 500 μm to about 10 mm, such as about 1 mm to about 10 mm such as about 5 mm to about 10 mm. In at least one alternative embodiment, which can be combined with other embodiments described herein, a micro-prism 506 of the first micro-prism array 502 and/or the second micro-prism array 504 can include a tapered thickness wherein the end with the greater thickness may include a thickness of up to about 0.1 μm to about 5 mm, alternatively about 10 μm to about 1 mm, alternatively about 100 μm to about 500 μm. in at least one embodiment, which can be combined with other embodiments described herein, a micro-prism 506 of the first micro-prism array 502 and/or the second micro-prism array 504 may also include an end with a lesser thickness of less than about 10 mm, such as about 0.1 μm to about 10 mm, such as about 0.1 μm to about 5 mm, such as about 0.1 μm to about 1 mm, such as about 0.1 μm to about 500 μm, such as about 0.1 μm to about 100 μm, such as about 0.1 μm to about 10. In at least one alternative embodiment, which can be combined with other embodiments a micro-prism 506 of the first micro-prism array 502 and/or the second micro-prism array 504 may also include an end with a lesser thickness of about 0.1 μm to about 1 mm, alternatively about 1 μm to about 500 μm, alternatively about 10 μm to about 100 μm. In at least one embodiment, the first micro-prism array 502 and the second micro-prism array 504 are oriented such that there exists a balance in the optical effect on the opposite side.

In at least one embodiment, which can be combined with other embodiments described herein, the first micro-prism array 502 and/or the second micro-prism array 504 can independently include any suitable number of micro-prisms 506, such as about 1 prism to about 10,000 prisms, such as about 1,000 prisms to about 10,000 prisms, such as about 5,000 prisms to about 10,000 prisms, alternatively about 1 prism to about 5,000 prisms, alternatively about 1 prism to about 1,000 prisms, alternatively about 1 prism to about 500 prisms. Such micro-prisms 506 may be configured such that there is a prism density (e.g., the number of prisms per unit area) of about 0.1 prisms/$cm^2$ to about 1,000 prisms/$cm^2$, such as about 1 prism/$cm^2$ to about 1,000 prisms/$cm^2$, such as about 10 prisms/$cm^2$ to about 1,000 prisms/$cm^2$, such as about 100 prisms/$cm^2$, to about 1,000 prisms/$cm^2$, such as about 500 prisms/$cm^2$ to about 1,000 prisms/$cm^2$, alternatively about 0.1 prisms/cm$^2$ to about 500 prisms/cm$^2$, alternatively about 0.1 prisms/cm$^2$ to about 100 prisms/cm$^2$, alternatively about 0.1 prisms/cm$^2$ to about 10 prisms/cm$^2$.

Figure 6:
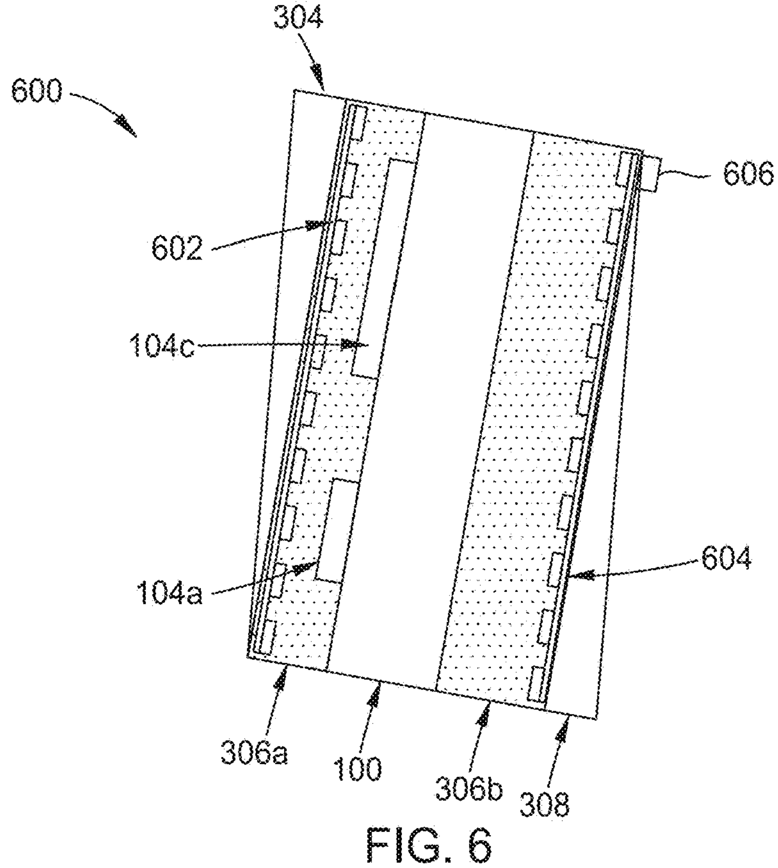
FIG. 6 is a schematic cross-sectional view of an optical device, according to at least one embodiment.

FIG. 6 is a schematic cross-sectional view of an optical device 600 according to one or more embodiments. In at least one embodiment, which can be combined with other embodiments described herein, the optical device 600 includes a waveguide 100 with an outcoupler grating 104*c* and an incoupler grating 104*a* disposed on the eye-side surface of the waveguide 100. The first prism 304 is disposed over the eye-side surface of the waveguide 100. in one embodiment, the first prism 304 is coupled to the waveguide 100 with the first adhesive layer 306*a*. In at least one embodiment, the first prism 304 includes a first array of structures 602 coupled to the underside surface of the first prism 304, such that the first array of structures 602 is in contact with the first adhesive layer 306*a*. The second prism 308 is disposed over the world-side surface of the waveguide 100. In one embodiment, the second prism 308 is coupled to the waveguide 100 with the second adhesive layer 306*b*. In at least one embodiment, the second prism 308 includes a second array of structures 604 coupled to the underside surface of the second prism 308, such that the second array of structures 604 is in contact with the second adhesive layer 306*b*.

In some embodiments, which can be combined with other embodiments described herein, an array of structures (e.g., the first array of structures 602 and/or the second array of structures 604) can include an array of grating structures. The array of grating structures (e.g., the first array of structures 602 and/or the second array of structures 604) can include any suitable grating structure known to one of ordinary skill in the art, such as blazed grating structures, grating structures having an angle relative to the surface of the prism, grating structures perpendicular to the surface of the prism, and the like. In at least one embodiment, which can be combined with other embodiments described herein, the array of grating structures (e.g., the first array of structures 602 and/or the second array of structures 604) can include grating structures which are perpendicularly oriented relative to the surface of the prism. In which case, a grating structure 606 of an array of grating structures (e.g., the first array of structures 602 and/or the second array of structures 604) can include a grating depth (e.g., length extending from the prism) of about 1 nm to about 10 μm, such as about 500 nm to about 10 μm, such as about 1 μm to about 10 μm, such as about 5 μm to about 10 μm, alternatively about 1 nm to about 5 μm, alternatively about 1 nm to about 1 μm, alternatively about 1 nm to about 500 nm. Furthermore, an individual grating structure can include a grating pitch of about 100 nm to about 100 μm, such as about 500 nm to about 100 μm, such as about 1 μm to about 100 μm, such as about 10 μm to about 100 μm, such as about 50 μm to about 100 μm, alternatively about 100 nm to about 50 μm, alternatively about 100 nm to about 10 μm, alternatively about 100 nm to about 1 μm, alternatively about 100 nm to about 500 nm. Grating structures 606 of an array of grating structures (e.g., the first array of structures 602 and/or the second array of structures 604) can include the same size parameters or different size parameters as the other grating structures 606 within the array.

In at least one embodiment, which can be combined with other embodiments described herein, the array of grating structures (e.g., the first array of structures 602 and/or the second array of structures 604) can independently include any suitable number of grating structures 606, such as about 1,000 grating structures to about 1,000,000 grating structures, such as about 50,000 grating structures to about 1,000,000 grating structures, such as about 100,000 grating structures to about 1,000,000 grating structures, such as about 500,000 grating structures to about 1,000,00 grating structures, alternatively about 1,000 grating structures to about 500,000 grating structures, alternatively about 1,000 grating structures to about 100,000 grating structures, alternatively about 1,000 grating structures to about 50,000 grating structures. Such grating structure arrays (e.g., the first array of structures 602 and/or the second array of structures 604) may be configured such that there is a grating structure density (e.g., the number of grating structures per unit area) on the surface of the prism of about 100 grating structures/cm$^2$ to about 100,000 grating structures/cm$^2$, such as about 500 grating structures/cm$^2$ to about 100,000 grating structures/cm$^2$, such as about 1,000 grating structures/cm$^2$ to about 100,000 grating structures/cm$^2$, such as about 50,000 grating structures/cm$^2$ to about 100,000 grating structures/cm$^2$, alternatively about 100 grating structures/cm$^2$ to about 50,000 grating structures/cm$^2$, alternatively about 100 grating structures/cm$^2$ to about 1,000 grating structures/cm$^2$, alternatively about 100 grating structures/cm$^2$ to about 500 grating structures/cm$^2$.

In some embodiments, which can be combined with other embodiments described herein, wherein the the first adhesive layer 306*a* coupling the first prism 304 to the waveguide 100 substantially contacts at least one of the grating structures 606 of the first array of structures 602 coupled to the underside surface of the first prism 304. In some embodiments, which can be combined with other embodiments described herein, wherein the first adhesive layer 306*a* coupling the first prism 304 to the waveguide 100 substantially contacts a plurality of the grating structures 606 of the first array of structures 602 coupled to the underside surface of the first prism 304.

In some embodiments, which can be combined with other embodiments described herein, wherein the second adhesive layer 306*b* coupling the second prism 308 to the waveguide 100 substantially contacts at least one of the grating structures 606 of the second array of structures 604 coupled to the underside surface of the second prism 308. In some embodiments, which can be combined with other embodiments described herein, wherein the second adhesive layer 306*b* binding the second prism 308 to the waveguide 100 substantially contacts a plurality of the grating structures 606 of the second array of structures 604 coupled to the underside surface of the second prism 308.

Figure 7:
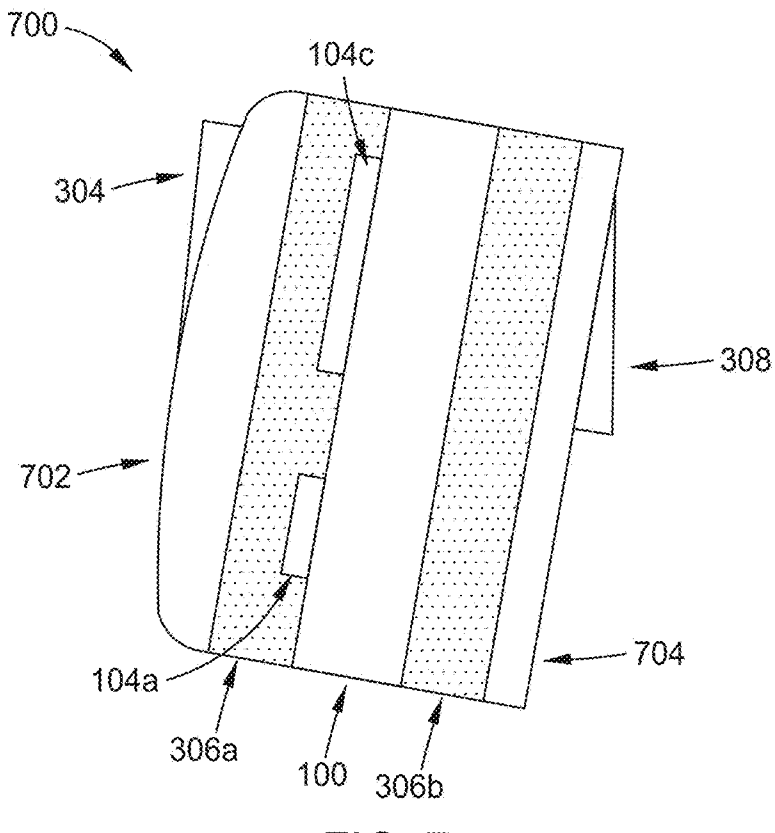
FIG. 7 is a schematic cross-sectional view of an optical device, according to at least one embodiment.

FIG. 7 is a schematic cross-sectional view of an optical device 700 according to one or more embodiments. The optical device 700 includes a waveguide 100 with an outcoupler grating 104*c* and an incoupler grating 104*a* disposed on the eye-side surface of the waveguide 100. In at least one embodiment, which can be combined with other embodiments described herein, a push/pull lens is configured around the waveguide 100. The push/pull lens includes a push lens (i.e., an eye-side lens 702) and a pull lens (i.e., a world-side lens 704). In at least one embodiment, the push lens is disposed over either the eye-side surface, and coupled to the waveguide 100 with the first adhesive layer 306*a*. In at least one embodiment, the pull lens is disposed over the world-side surface of the waveguide 100, and coupled to the waveguide 100 with the second adhesive layer 306*b*. In at least one embodiment, the push/pull lens includes an eye-side lens 702 and a world-side lens 704, wherein the eye-side lens 702 is disposed over the eye-side surface of the waveguide 100 and the world-side lens 704 is disposed over the world-side surface of the waveguide 100. The eye-side lens 702 and a world-side lens 704 of the push/pull lens may be coupled to the waveguide 100 with the first adhesive layer 306*a* or the second adhesive layer 306*b*.

In some embodiments, which can be combined with other embodiments described herein, the eye-side lens 702 includes the first prism 304 disposed on the outer surface of the eye-side lens 702. In other words, the first prism 304 is configured/disposed over the eye-side lens 702 such that the first prism 304 is not coupled to the eye-side surface of the waveguide 100. In some embodiments, the world-side lens 704 includes the second prism 308 disposed on the outer surface of the world-side lens 704. In other words, the second prism 308 is configured/disposed over the world-side lens 704 such that the second prism 308 is not coupled to the world-side surface of the waveguide 100. In one or more embodiments, the first prism 304 disposed on the outer surface of the eye-side lens 702 and/or the second prism 308 disposed on the outer surface of the world-side lens 704 are configured such that at least one of either the first prism 304 and/or the second prism 308 is at least partially disposed over the outcoupler grating 104*c* of the waveguide 100. In one or more embodiments, the first prism 304 disposed on the outer surface of the eye-side lens 702 and/or the second prism 308 disposed on the outer surface of the world-side lens 704 are configured such that at least one of either the first prism 304 and/or the second prism 308 is substantially disposed over the outcoupler grating 104*c* of the waveguide 100.

In some embodiments, which can be combined with other embodiments described herein, an eye-side lens 702 can include a thickness of about 0.1 mm to about 10 mm, such as about 1 mm to about 10 mm, such as about 5 mm to about 10 mm, alternatively about 0.1 mm to about 5 mm, alternatively about 0.1 mm to about 1 mm. In some embodiments, which can be combined with other embodiments described herein, a world-side lens 704 can include a thickness of about 0.1 mm to about 10 mm, such as about 1 mm to about 10 mm, such as about 5 mm to about 10 mm, alternatively about 0.1 mm to about 5 mm, alternatively about 0.1 mm to about 1 mm.

Figure 8:
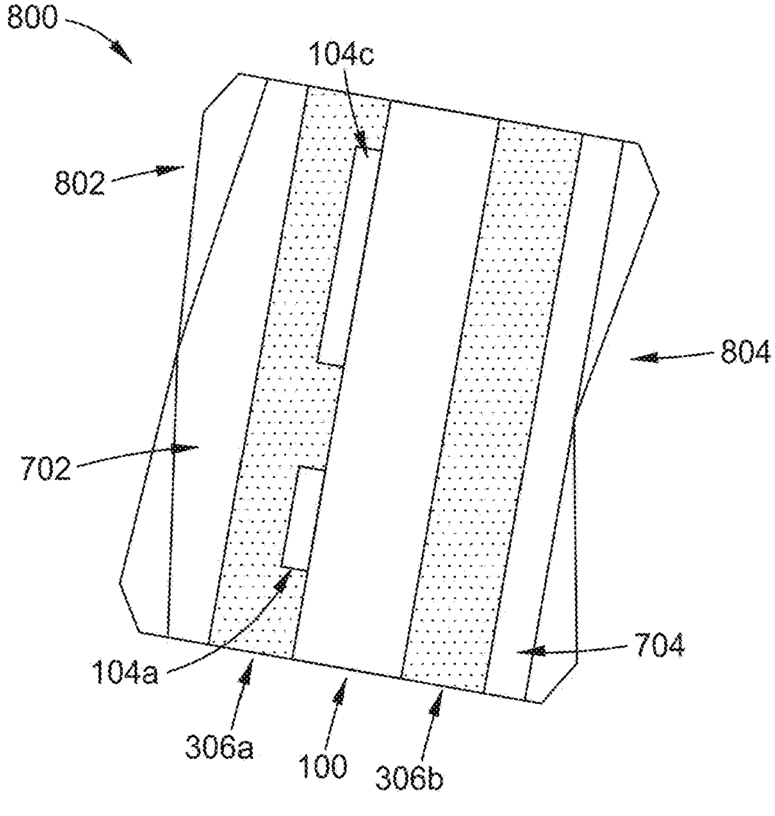
FIG. 8 is a schematic cross-sectional view of an optical device, according to at least one embodiment.

FIG. 8 is a schematic cross-sectional view of an optical device 800 according to one or more embodiments. The optical device 800 includes a waveguide 100 with an outcoupler grating 104*c* and an incoupler grating 104*a* disposed on the eye-side surface of the waveguide 100. In at least one embodiment, which can be combined with other embodiments described herein, the push/pull includes an eye-side lens 702 and a world-side lens 708, wherein the eye-side lens 702 is disposed over the eye-side surface of the waveguide 100 and the world-side lens 704 is disposed over the world-side surface of the waveguide 100. The eye-side lens 702 and a world-side lens 704 of the push/pull lens may be coupled to the waveguide 100 with the first adhesive layer 306*a* and/or the second adhesive layer 306*b*. In some embodiments, the eye-side lens 702 includes a first tapered prism 802 disposed on the outer surface of the eye-side lens 702, wherein the first tapered prism 802 is integrated with at least one taper(s). Such taper(s) may be integrated with the first tapered prism 802 to retain smoothness of the eye-side lens 702. In some embodiments, the world-side lens 704 includes a second tapered prism 804 disposed on the outer surface of the world-side lens 704, wherein the second tapered prism 804 is integrated with at least one taper(s). Such taper(s) may be integrated with the second tapered prism 804 to retain smoothness of the world-side lens 704.

In some embodiments, which can be combined with other embodiments described herein, the first tapered prism 802 and/or the second tapered prism 804 can be integrated with one or more taper(s) such that position in which the first tapered prism 802 and/or the second tapered prism 804 is at its greatest thickness is located between a first end and a second end of thereof. In other words, the first tapered prism 802 and/or the second tapered prism 804 have a continuously decreasing thickness progressing outwards from the position of the greatest thickness. In one or more embodiments, which can be combined with other embodiments described herein, the position of the greatest thickness of the first tapered prism 802 and/or the second tapered prism 804 may include a thickness of up to about 10 mm, such as about 1 mm to about 10 mm, such as about 2.5 mm to about 10 mm, such as about 5 mm to about 10 mm. The first tapered prism 802 and/or the second tapered prism 804 may also include a position having a lowest thickness. In one or more embodiments, which can be combined with other embodiments described herein, the position of the lowest thickness may include a thickness of about 100 μm, such as about 100 μm to about 1,000 μm, such as about 100 μm to about 500 μm, such as about 100 μm to about 250 μm. In at least one embodiment, the first tapered prism 802 and the second tapered prism 804 are oriented such that there exists a balance in the optical effect on the opposite side. In other words, the position of greatest thickness of the first tapered prism 802 is opposite the position of the lowest thickness of the second tapered prism 804.

Figure 9A:
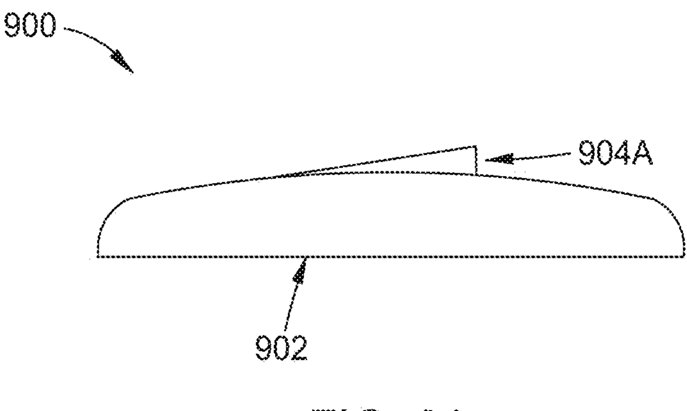
FIGS. 9A and 9B are schematic views of a lens integrated with a prism, according to one embodiment.
Figure 9B:
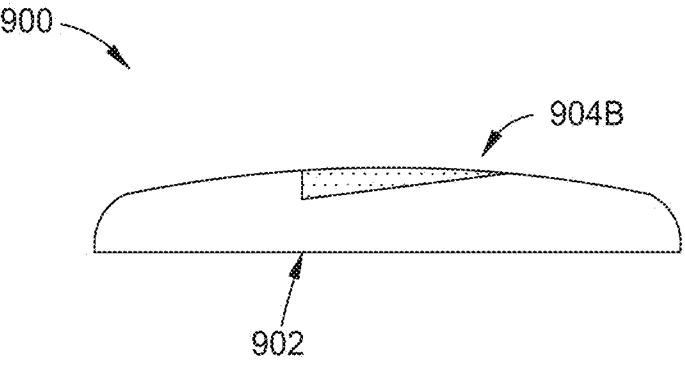

FIGS. 9A and 9B are schematic cross-sectional view of a lens (e.g., a push lens or a pull lens) integrated with a prism. FIG. 9*a* shows a cross-sectional view of a lens 902 with a first prism 904*a* disposed thereon. FIG. 9*b* shows a cross-sectional view of a lens 902 including a second prism 904*b*, wherein the second prism 904*b* is a cavity imparted into the surface of the lens 902. In an exemplary embodiment, which can be combined with other embodiments described herein, the first prism 904*a* of FIG. 9*a* and the second prism 904*b* of FIG. 9*b* are optically equivalent. In some embodiments, push/pull lenses of the present disclosure can be integrated with any one or more prisms of the present disclosure (e.g., either a prism disposed thereon as an external structure or disposed therein as a cavity in the lens), so long as the prism pair is in optical equivalence.

The present disclosure provides prism pair and waveguide configurations, which have both a low FOV location and a low world leakage angle. It has been found that employing an eye-side prism increases the angle of the image projected to the eye relative to a horizontal plane of the waveguide such that the FOV is lower relative to the user's eye. Furthermore, implementing a world-side prism increases the angle of the light leakage relative to the horizontal plane of the waveguide such that the world leakage angle is lower relative to the user's eye. Additionally, the disclosure provides push/pull lens configurations integrating prisms and arrays thereof while also maintaining the smoothness commonly associated with lens used augmented reality systems.

While the foregoing is directed to embodiments of the present disclosure, other and further embodiments of the disclosure may be devised without departing from the basic scope thereof, and the scope thereof is determined by the claims that follow.

What is claimed is:

1. An optical device comprising:

a waveguide, the waveguide having an eye-side surface and a world-side surface opposing the eye-side surface, wherein an input coupler and an output coupler are disposed over the eye-side surface or the world-side surface;

a first prism disposed over at least the output coupler and over the eye-side surface, wherein the first prism has a first tapered thickness that increases from a first end of the output coupler adjacent to the input coupler to a second end of the output coupler opposite the first end of the output coupler; and a second prism disposed under at least the output coupler and under the world-side surface, wherein the second prism has a second tapered thickness that decreases from the first end of the output coupler to the second end of the output coupler.

2. The optical device of claim 1, wherein the first prism comprises an optically transparent material having a refractive index of greater than about 1.4.

3. The optical device of claim 1, wherein the first prism comprises glass, aluminum oxide based materials, polycarbonate materials, acrylic materials, titanium dioxide based materials, or combinations thereof.

4. The optical device of claim 1, wherein the second prism comprises an optically transparent material having a refractive index of greater than about 1.4.

5. The optical device of claim 1, wherein the second prism comprises glass, aluminum oxide based materials, polycarbonate materials, acrylic materials, titanium dioxide based materials, or combinations thereof.

6. An optical device comprising:

a waveguide, the waveguide having a first surface and a second surface opposing the first surface, wherein an input coupler and an output coupler are disposed over the first surface or the second surface; and an eye-side lens integrated with an eye-side prism, the eye-side lens disposed over at least the output coupler and over the first surface; and a world-side lens integrated with a world-side prism, the world-side lens disposed over at least the output coupler and over the second surface.

7. The optical device of claim 6, wherein the eye-side prism is disposed over the first surface and the world-side prism is disposed over the second surface.

8. The optical device of claim 7, wherein the first material and the second material both comprise a silica-containing aerogel material.

9. The optical device of claim 6, wherein the eye-side prism has a first thickness, wherein the first thickness increases from a first end of the output coupler to a center of the output coupler and decreases from the center to a second end of the output coupler.

10. The optical device of claim 9, wherein the world-side prism has a second thickness, wherein the second thickness increases from the first end of the output coupler to the center of the output coupler and decreases from the center to a second end of the output coupler.

11. An optical device comprising:

a waveguide, the waveguide having a first surface and a second surface opposing the first surface, wherein an input coupler and an output coupler are disposed over the first surface or the second surface;

a push lens disposed over the first surface, the push lens having a first prism disposed on or in the push lens, the first prism has a first thickness that decreases from a first end of the first prism to a second end of the first prism; and a pull lens disposed under the second surface, the pull lens having a second prism disposed on or in the pull lens, wherein:

the second prism comprises a second thickness that increases from a first end of the second prism to a second end of the second prism, the first end of the first prism is opposite the first end of the second prism, and the second end of the first prism is opposite the second end of the second prism.

12. The optical device of claim 11, wherein the first prism and the second prism are disposed over the output coupler.

13. The optical device of claim 12, wherein the first prism is disposed in a cavity of the push lens.

14. The optical device of claim 12, wherein the second prism is disposed in a cavity of the pull lens.

15. The optical device of claim 12, wherein the first prism and the second prism are optically equivalent.

* * * * *